United States Patent [19]

Howard

[11] 4,336,778
[45] Jun. 29, 1982

[54] SAFETY LIMITER FOR ENGINE SPEED

[75] Inventor: William A. Howard, Troy Township, Geauga County, Ohio

[73] Assignee: Delta Systems, Inc., Streetsboro, Ohio

[21] Appl. No.: 125,997

[22] Filed: Feb. 29, 1980

[51] Int. Cl.³ .................... F02P 11/00; B60K 31/00; F02D 1/04
[52] U.S. Cl. ................................. 123/334; 123/335; 123/198 D; 123/198 DC
[58] Field of Search ............. 123/334, 335, 320, 351, 123/630, 198 D, 198 DB, 198 DC; 180/170–179

[56] References Cited

U.S. PATENT DOCUMENTS

| | | | |
|---|---|---|---|
| 2,971,596 | 2/1961 | Davis et al. | 180/179 |
| 3,547,216 | 12/1970 | Marie | 123/335 |
| 3,563,219 | 2/1971 | Mieras | 123/335 |
| 3,626,919 | 12/1971 | MacMillan | 123/198 DB |
| 3,695,379 | 10/1972 | Veilleux | 123/198 D |
| 3,767,972 | 10/1973 | Noddings et al. | 123/351 |
| 3,863,618 | 2/1975 | Scholz | 123/198 D |
| 3,884,203 | 5/1975 | Cliffgard | 123/335 |
| 3,900,013 | 8/1975 | Vignozzi et al. | 123/335 |
| 3,967,603 | 7/1976 | Habert | 123/335 |
| 4,074,665 | 2/1978 | Patis | 123/335 |
| 4,155,418 | 5/1979 | Tremblay et al. | 123/334 |
| 4,163,431 | 8/1979 | Wilkenson | 123/335 |
| 4,204,490 | 5/1980 | Obki et al. | 123/335 |
| 4,237,833 | 12/1980 | Des Lauriers | 123/320 |

Primary Examiner—Raymond A. Nelli
Attorney, Agent, or Firm—Watts, Hoffmann, Fisher & Heinke Co.

[57] ABSTRACT

A safety system for limiting the speed of a fuel powered engine, particularly an internal combustion engine of a vehicle or machine, preferably by controlling the engine ignition. The system is especially useful for vehicles such as snowmobiles, motorcycles, power boats, and the like. An alternating or pulsed electrical output directly proportional to engine rpm is detected and the rpm is limited to one of two or more different levels, depending upon the condition of a programming switch or switches, in this embodiment a throttle switch. An upper level limits engine speed to a safe rpm in the event of load removal, such as when a drive belt breaks or a gear change is missed. Engine speed is limited to a lower level if the throttle switch indicates idle rpm is desired and if the engine does not begin to decelerate from a higher rpm within a predetermined time, regardless of the actual throttle condition. In drives utilizing automatic drive clutches, the lower level of rpm is below the engine speed necessary to engage the clutch.

22 Claims, 7 Drawing Figures

SAFETY LIMITER FOR ENGINE SPEED

BACKGROUND OF THE INVENTION

1. Field of the Invention

This invention relates to a safety system for limiting the speed of an engine, for example, when a fuel throttle is stuck open or the engine load is removed.

2. Prior Art

Engine driven machines, such as vehicles, and especially recreational vehicles, can create situations dangerous to the operator and others if an engine speed control or throttle is stuck in an open or high speed condition. For example, this is especially a problem with snowmobiles operated in a cold environment in which the throttle linkage or the carburetor for the engine can stick or freeze. Also, high engine speed can result from removal of the load on an engine; for example, when a drive belt breaks, or the vehicle overturns, or a gear shift is missed or if a drive propeller of a water vehicle is removed from the water. This can damage the engine or drive train and in some cases may cause the clutch to explode, endangering the operator.

Some vehicles have provided so-called "kill switches" for stopping the engine in a runaway situation, but this requires operator actuation and may not be satisfactory in a crisis situation. Also, when starting an engine, if the throttle is stuck in an open or high speed condition, engine speed reaches high rpm rapidly. In vehicles operated through a centrifugal clutch, the drive train is automatically engaged at a relatively low engine speed and the vehicle can move out of control, upon starting. While the throttle condition can be checked prior to startup, an operator often neglects to do so.

One approach to a solution of the above problem on snowmobiles is to provide two switches, one responsive to throttle actuation and one responsive to carburetor condition. If a carburetor element is stuck open after the throttle lever is released, the engine is killed by shorting the ignition coil. See U.S. Pat. No. 4,155,418. This approach requires carburetor modification. Also, the carburetor switch arrangement is insensitive to a no-load situation that does not involve an improper relationship between the carburetor condition and the throttle switch condition. Moreover, known limiting arrangements do not allow operation of the engine at a low or safe speed with a malfunction. As a result the operator cannot use the engine or drive the vehicle at all even in an intermittent manner. Once an engine is stopped, it may be difficult to restart and therefore killing the engine can result in an unsafe or hazardous situation in adverse environments, such as in a frigid environment where a snowmobile may be operated.

Other approaches to controlling engine operation have included cutting off engine ignition when the engine speed is greater than a throttle setting, but without more, these arrangements result in engine cutoff during normal deceleration. This causes accumulation of fuel in the exhaust system and subsequent backfire and can cause damage to the engine and exhaust system.

SUMMARY OF THE INVENTION

The present invention provides an engine speed limiting system for fuel powered engines, especially useful for internal combustion engines with electrical ignition systems. It finds particular use for vehicles driven by small magneto or capacitor discharge ignition internal combustion engines, but has wider application. The system not only limits engine speed if a fuel control is stuck in an open or high speed condition, but also if for any reason the engine speed exceeds a predetermined established limit, as when the engine load is removed. In accordance with a particularly advantageous feature of this invention, if the engine fails to decelerate upon release of the engine speed control, such as the throttle actuator, the engine speed is automatically reduced to a safe level, such as a level below that necessary for engagement of a centrifugally operated clutch in the drive train; but the engine is not shut off. Moreover, a sufficient delay is established before the system reduces the engine speed, to allow for the normal deceleration to occur before the engine speed is limited. Most advantageously, the duration of the delay is changed in response to engine operation, so the delay is reduced if the engine is accelerating when the excess engine speed is sensed. This assures, e.g., that under the dangerous situation of an engine being started with the throttle stuck in an open position, the delay in limiting the engine speed will be extremely short. In addition to achieving these safety features, the system permits operation of the engine, even with a stuck throttle, in a sporadic or "jogging" mode by momentary actuation of the throttle control. Thus, in an emergency situation a vehicle can be moved. This is possible because the engine is never prevented from operating by the limiting system. Rather, with throttle actuation, it can always be operated at speeds up to the limited maximum engine speed.

In the preferred embodiment of the invention, the engine speed limiting system is electrically connected between an alternator driven by the engine and the engine ignition circuit, and is also electrically connected to a throttle sensor switch normally open when the throttle control is in an idle position. The normally open construction provides a fail safe system that assures engine operation in the low speed mode if the switch is disconnected accidentally or intentionally. The preferred system limits the engine speed by affecting the ignition and includes:

(1) a power supply that provides a sawtooth D.C. voltage from the alternator; (2) a pulse conditioner that produces square waves from the alternator and power supply output, one square wave for each positive alternator pulse; (3) a frequency to voltage converter that converts the square wave pulses to a voltage level proportional to the pulse frequency and hence proportional to the engine speed; (4) a voltage level detector that interrupts the engine ignition if the voltage is at a certain level, in which case the engine speed is caused to decrease below that level; (5) a deceleration monitor that determines whether the engine is decelerating and if so prevents the voltage level detector from interrupting the ignition, but if the engine continues to run at a constant speed or accelerates after the throttle control is released, the monitor allows the voltage level detector to provide pulses that short the engine ignition on a periodic basis after a time delay; (6) a time delay that allows for normal deceleration after release of the throttle control before the deceleration monitor will allow interruption of the ignition, which delay is shortened if the engine is accelerating to assure a more rapid speed limitation; (7) a feedback latch circuit to maintain engine deceleration, once begun under the speed limiting system, until the engine speed reaches the lower established speed limit or until the operator closes the throttle switch indicative of desire for higher engine speed; and (8) an ignition interrupting switch that interrupts the ignition in response to an output signal from the voltage detector.

The detected voltage level that controls ignition interruption is shifted by a throttle sensor switch closed when the operator actuates the engine throttle. If the throttle switch is closed by actuation of the throttle control, the operative voltage level is high, allowing maximum limited engine speed. This level functions, e.g., if there is insufficient load on the engine. When the throttle control switch is open (released by the operator), a lower voltage level functions and the operative maximum speed level of the engine is established at a low value, above the idle speed but preferably below the speed at which a centrifugal, i.e., automatic, drive clutch in a related power transmission will engage. Thus, with the throttle actuator in an idle position (not actuated by the operator), power cannot be transmitted to the drive train regardless of actual throttle condition. In either case, the motor speed will oscillate at the controlled level, making the presence of a malfunction known to the operator by the oscillating sound of the engine speed.

The above and other features and advantages of this invention will become more apparent and better understood from the detailed description that follows, when considered in connection with the accompanying drawings.

DETAILED DESCRIPTION

Figure 1:
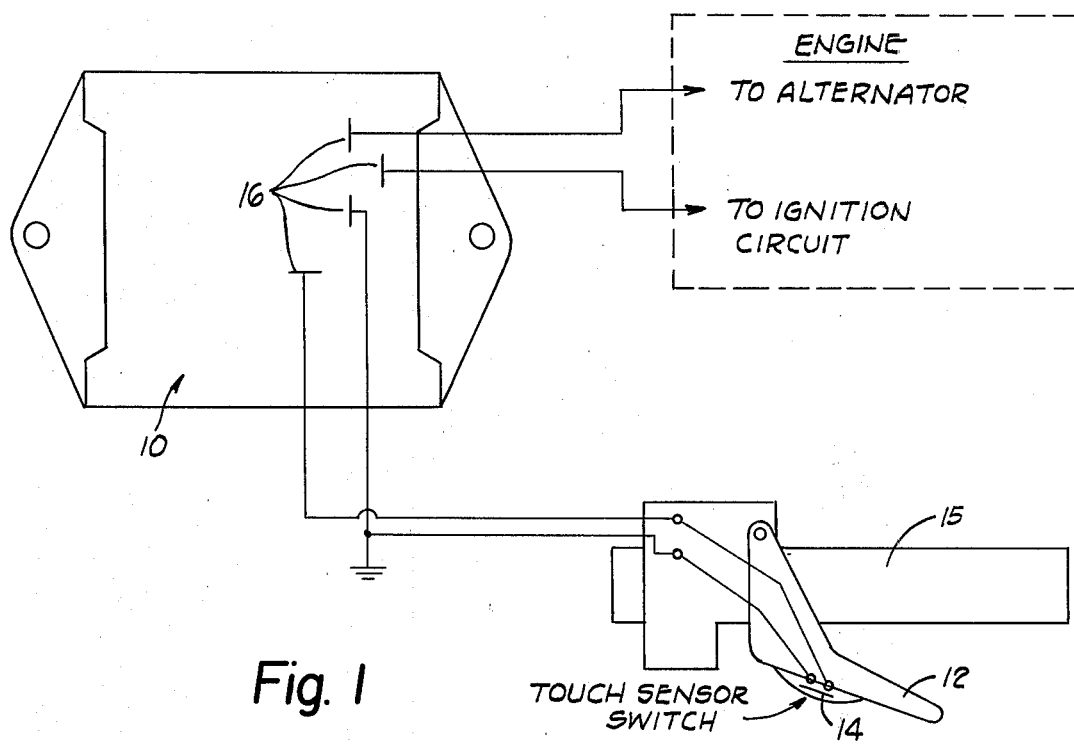
FIG. 1 is a diagrammatic view of the speed limiting system of the present invention, illustrating a module containing a control circuit, an exemplified throttle control, and indicating the manner in which the module is connected to components of the engine and throttle control.

With reference to the drawings, in the preferred arrangement shown, the speed limiting system is embodied in a circuit module 10 (FIG. 1) for use with an internal combustion engine having a magneto or capacitor discharge ignition. The engine in this case is being used to drive a vehicle, which for purposes of the present description is by way of example a snowmobile (not shown). As is known, snowmobiles are typically driven by an endless belt through a drive train from the engine. The drive train includes an automatic clutch such as a torque converter that engages the drive train when the engine speed is above a predetermined low level, somewhat above idle speed of the engine. The engine speed is controlled from a hand throttle 12 with which an operator-force sensor switch 14 is associated, both being carried on a steering handle 15. The module is constructed to be conveniently mountable on the snowmobile and electrically connected to the vehicle alternator, to an ignition circuit, to the sensor switch 14 and to a ground potential, as generally indicated in FIG. 1. The interconnection of the module to those circuit elements is typically through prongs 16 receivable in a socket (not shown) to which the circuit elements are electrically connected.

As illustrated in FIG. 1, the sensor switch 14 associated with the hand operated throttle lever 12 is open when the lever is in a released position, at which the engine idles. Upon actuation of the throttle lever, the sensor switch 14 closes. The switch 14 programs the speed limiting system to select one of two controlled engine speeds. When the switch 14 is open, the engine speed is limited to a predetermined low level insufficient to cause the clutch to transmit force from the engine to the vehicle drive system. Thus, if the switch becomes disconnected, a safe operation is assured. When the switch is closed, the engine speed is limited to a predetermined high level, slightly above the normal maximum operating speed, but below a speed at which the engine will be damaged or the clutch will explode merely by the rpm.

Figure 2:
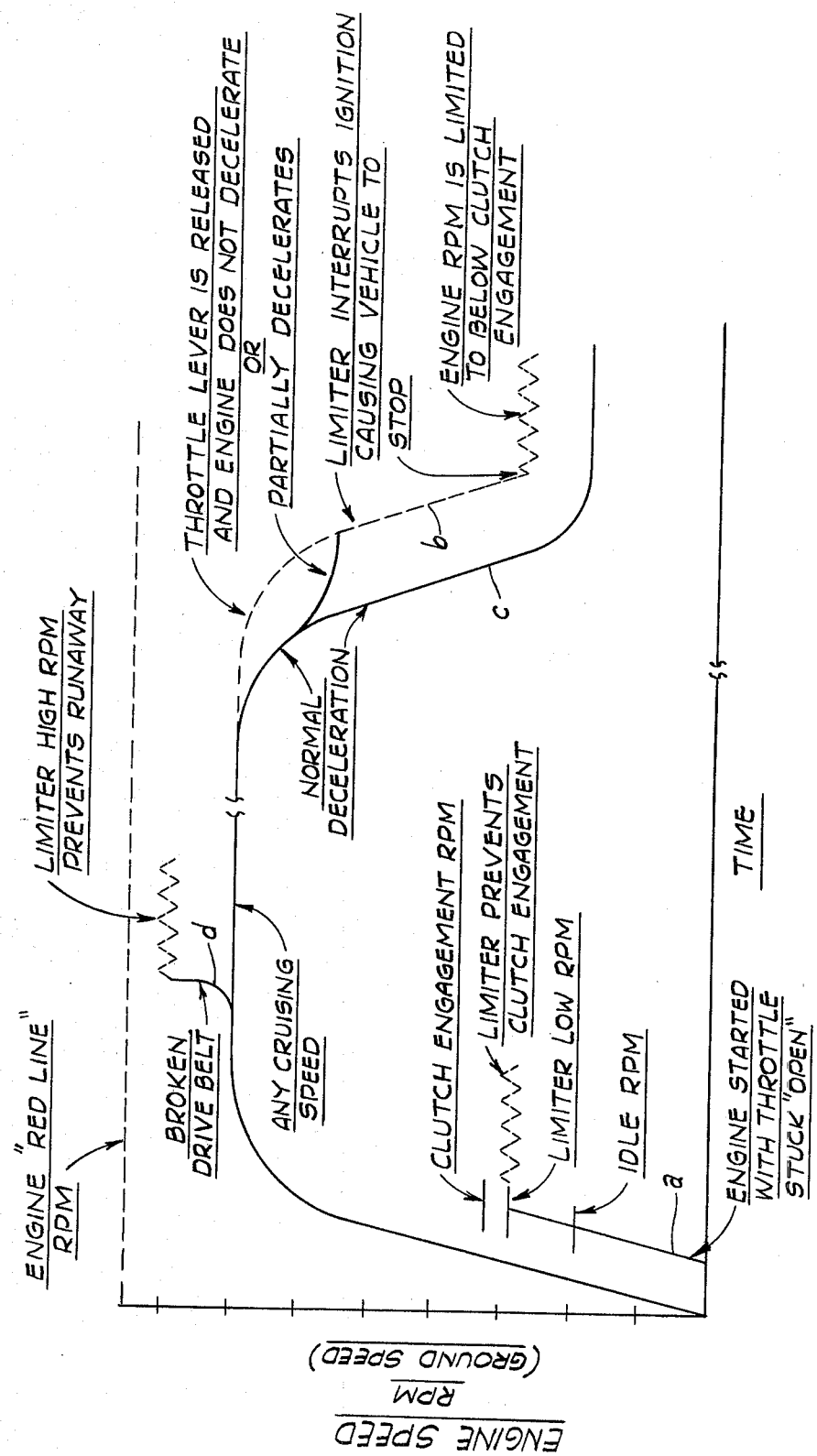
FIG. 2 is a graph of engine speed versus time, illustrating the manner in which the control system modifies engine performance to assure safe operation.
Figure 3:
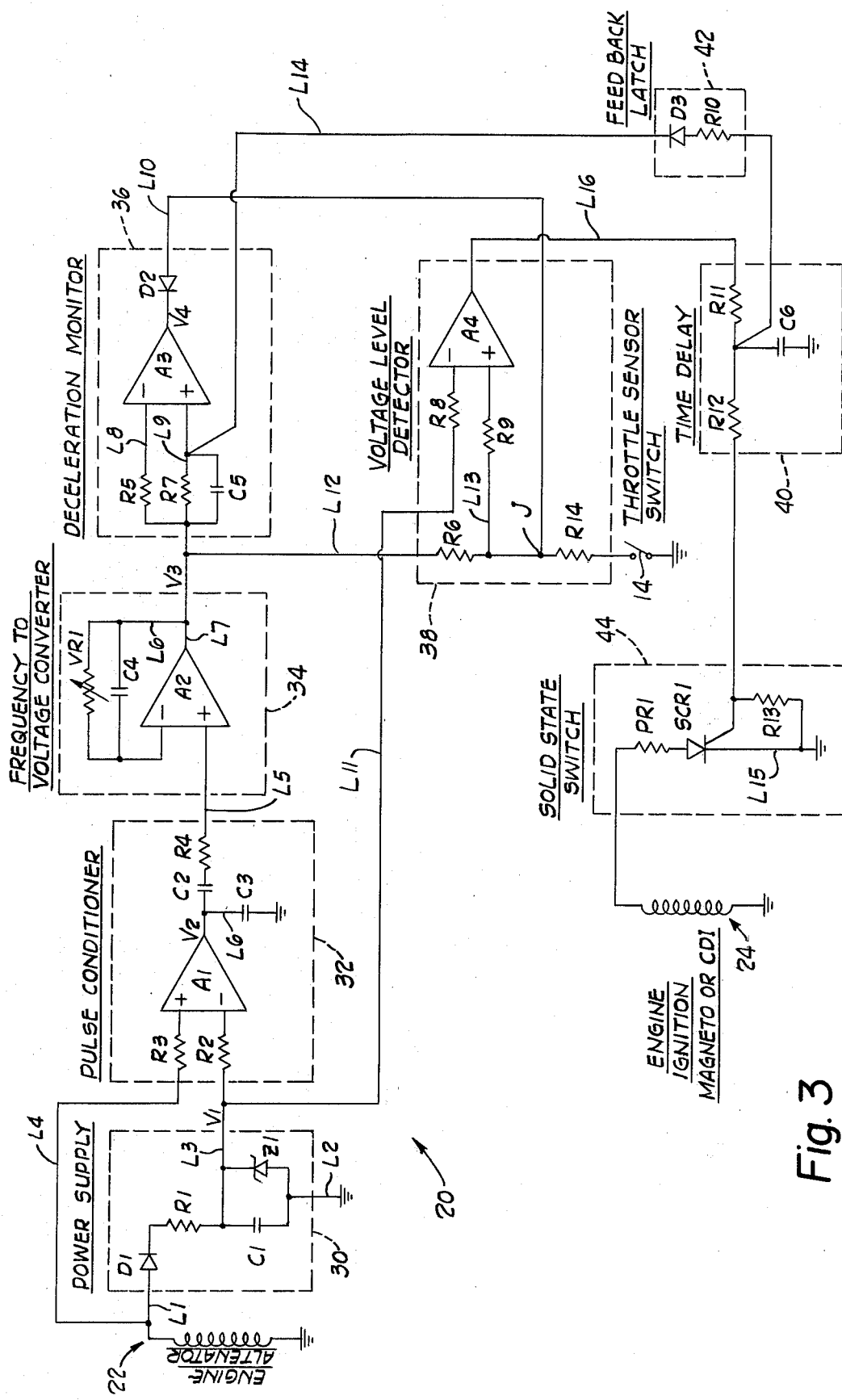
FIG. 3 is a combined block and circuit diagram of the speed limiting circuit.

The system comprises a circuit 20 shown in FIG. 3 that senses the speed of the engine from and is energized by an electrical source that produces signals synchronous with engine speed. More specifically, the circuit operates from an alternator 22 driven by the crankshaft of the engine, although with a high impedance circuit the ignition could be used directly for the power and the frequency signal. The circuit produces control signals that modify engine operation by interrupting the engine ignition 24 under predetermined conditions. The conditions are illustrated in graphic form in FIG. 2. The system is constructed so that when the engine speed reaches a predetermined lower limit and the throttle sensor switch 14 is open, indicating the throttle should be in an idle position, the engine speed will not go beyond the predetermined lower limit, which is low enough to prevent the clutch from transmitting torque. This is illustrated by curve "a" in FIG. 2. Curve "a" is offset on the time scale slightly for purposes of illustration only and indicates the condition of starting the engine with the throttle stuck open. At the level where the engine speed is limited (low rpm), oscillation of the engine speed occurs, as will be explained subsequently. When the engine speed is above the lower limit and the throttle sensing switch 14 is then opened, indicating the release of the throttle control lever, and if the engine does not decelerate, the system interrupts and limits the engine speed to the low level, as indicated by curve "b"; but if the engine speed does decrease within a certain time, the ignition is not interrupted and the speed is not limited, as indicated by curve "c," the time of such delay being decreased if engine speed is accelerating when the sensor switch 14 is open. When the engine speed reaches a predetermined high limit with the sensor switch 14 closed, the system limits the engine speed to the high limit, as indicated by curve "d."

Thus, upon start up, with the throttle lever in idle position, if the throttle is stuck open the engine will not be operated at a speed sufficient to engage the drive train. During operation, e.g., at cruising speed, if the throttle lever is released and the engine speed does not decrease within a short, predetermined, time limit, the system will interrupt the ignition and decrease the engine speed to below clutch operating speed regardless of the actual throttle setting. During operation, if the load on the engine is removed, as from a broken drive belt or a missed shift in a vehicle having a shifting transmission, the maximum engine speed will be limited to a level safe for the engine clutch and drive train. In all events, the ignition is only interrupted intermittently at the two preset high and low levels, so the engine will continue to operate, but only at the applicable preset limit.

As shown in FIG. 3, the circuit 20 encapsulated in the module 10 comprises a power supply 30, a pulse conditioner 32, a frequency-to-voltage converter 34, a deceleration monitor 36, a voltage level detector 38, a time delay 40, a feedback latch 42, and an ignition interrupter 44.

The engine alternator 22 produces an alternating voltage that has a peak potential in the embodiment depicted of 20-70 volts, depending upon engine speed (rpm). A voltage regulator limits the maximum current produced by the alternator to provide operating ranges compatible with the current requirements, such as lighting the headlamps, etc.

POWER SUPPLY

Figure 4:
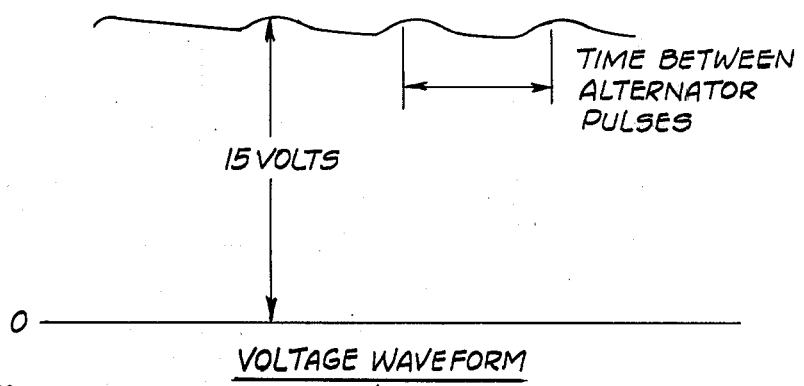
FIG. 4 is a diagram of the voltage waveform at the location indicated by V1 in FIG. 3.

The power supply 30 is connected to the output of the alternator 22 through an electrical circuit line L1. The alternating voltage entering the power supply is converted to D.C pulses by a diode D1 that are stored by a capacitor C1 to provide a power source to operate other portions of the system circuit 20. A Zener diode Z1 establishes a peak D.C. voltage, about 15 volts in the present embodiment, and a resistor R1 limits the current through the Zener diode while it is conducting. A ground connection is made through a line L2. An output V1 from the power supply is introduced by a line L3 to the pulse conditioner 32. It is to be understood that the voltage source of the power supply is supplied to all components for their operation, although not depicted. The voltage waveform V1 is illustrated in FIG. 4 of the drawings, at a value of 15 volts by way of example, with a sawtooth profile. The distance between peak voltages indicates the time between alternator pulses.

PULSE CONDITIONER

Figure 5:
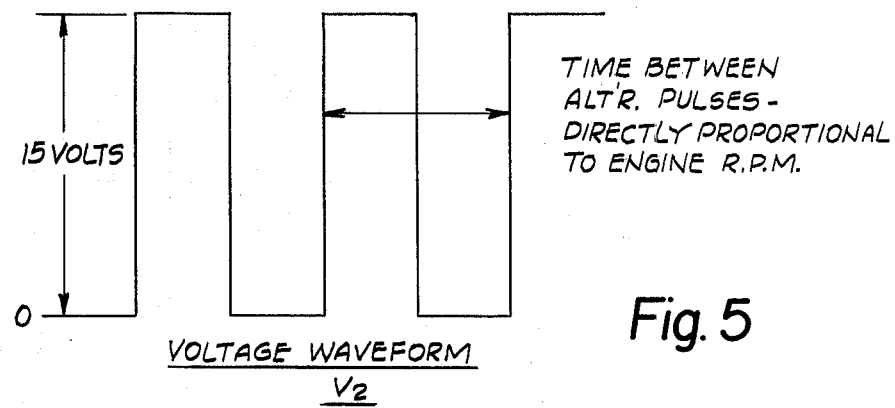
FIG. 5 is a diagram of the voltage waveform at the location indicated by V2 in FIG. 3.

The pulse conditioner 32 produces square waves from the output of the alternator 22 and the output of the power supply 30. A comparator A1 receives current at a positive input through a line L4 from the alternator 22 and through a resistor R3. Line L3 provides the signal of V1 to a negative input of the comparator A1 through a resistor R2, which holds the comparator in the "off" state (i.e., no output voltage V2) until a voltage from the alternator increases to where more current flows through resistor R3 than resistor R2, at which time the output of the comparator A1 goes high. When the alternator output diminishes, the comparator A1 returns to the "off" condition. FIG. 5 illustrates the output waveform V2, showing by way of example a voltage of 15 volts in the preferred embodiment. One square wave is produced with each positive pulse from the alternator. Depending upon the alternator, it may produce two or more pulses per crankshaft revolution of the engine. Regardless of the number of pulses per revolution, the frequency of the square wave is directly proportional to the engine rpm. The square wave pulses are converted to short current pulses through a coupling capacitor C2 and a resistor R4 in series in a line L5 from the output of the comparator A1. A capacitor C3 in a line L6 to ground provides a filtering action in the output of the comparator A1 to filter out unwanted signals that can be coupled through the comparator and associated circuitry.

FREQUENCY-TO-VOLTAGE CONVERTER

Figure 6:
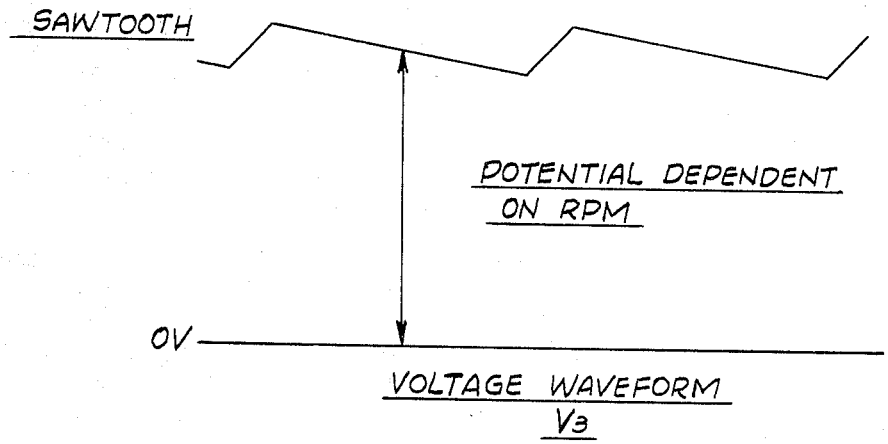
FIG. 6 is a diagram of the voltage waveform at the location indicated by V3 in FIG. 3.

Current pulses from the line L5 are supplied to a positive input of a comparator A2 of the frequency-to-voltage converter 34. A negative input of the comparator A2 is connected to the output of A2 through a feedback circuit L6 in which a variable resistor VR1 and a capacitor C4 are connected in parallel between the output and the negative input. Current pulses from the line L5 causes the output of the comparator A2 at line L7 to go high, causing the capacitor C4 to begin charging. The charge current of capacitor C4 appears at the negative input of the comparator A2, causing the comparator to turn off. The capacitor then discharges through the variable resistor VR1 and the comparator output goes high. This continued turn on-turn off action produces a voltage V3 at the output that is proportional to the frequency of the input and is illustrated in FIG. 6. Since the frequency of the input is proportional to the engine speed in rpm, the voltage level V3 is also proportional to the engine speed. Because the variable resistor VR1 is adjustable, it may be initially set to compensate for all manufacturing and component tolerances. Additionally, it is used to "program" the minimum and maximum speed limits established by the circuit, as will become more apparent later. Regardless of the level of the voltage at V3, its basic waveform includes a sawtooth ripple due to the discharging of capacitor C4 between input pulses.

DECELERATION MONITOR

The voltage signal V3 at line L7 provides current through a resistor R5 in a line L8 to the negative input of a comparator A3 of the deceleration monitor 36 proportional to V3. This current holds the output of the comparator A3 in the low state, causing the cathode of a diode D2 to be grounded, so the voltage at V4 is zero. As the sawtooth voltage ripple of the waveform V3 increases, a capacitor C5 connected across a resistor R7 in a line L9 begins to charge and provides current to a positive input of the comparator A3, causing the output of the comparator to go high. The output remains high until the capacitor C5 is charged, at which time the resistor R7 reduces the signal at the positive input to a lower level than at the negative input. After the peak of the sawtooth waveform has occurred, the capacitor C5 discharges slightly through the resistor R7 and then recharges on the next sawtooth.

When the level of the voltage V3 remains constant, or increases with engine acceleration, the charging action of the capacitor C5 causes the output of the comparator A3 to turn on and off at a frequency proportional to that of the sawtooth, because the capacitor C5 will continually charge and discharge in response to the voltage variation illustrated by the sawtooth waveform. Additionally, the duration of on time, i.e., the time in which the comparator A3 is producing an output, is dependent upon the rate of acceleration. This affects the time delay provided by the circuit 40, as will be explained subsequently.

Figure 7:
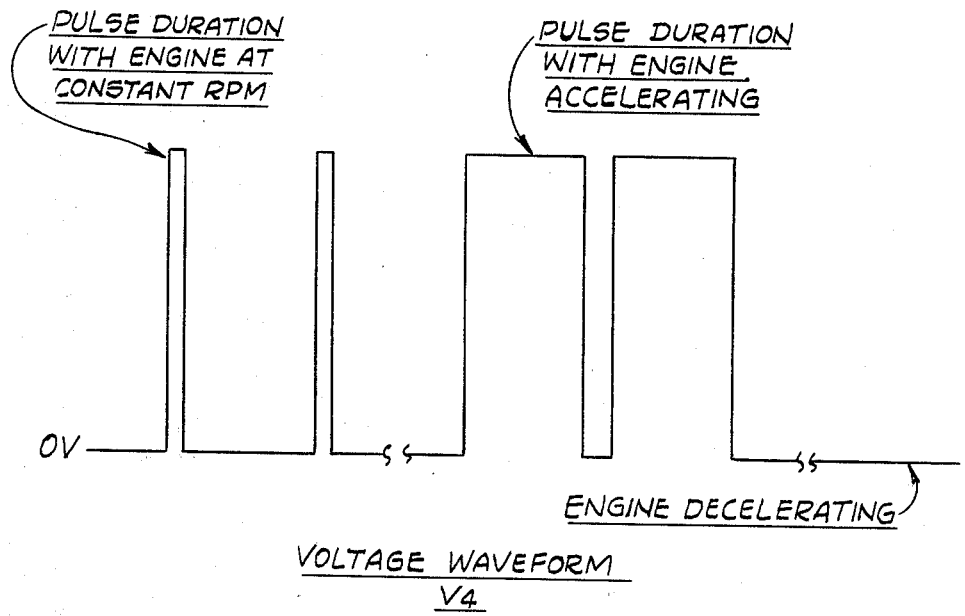
FIG. 7 is a diagram of the voltage waveform at the location indicated by V4 in FIG. 3.

When the voltage V3 decreases, upon engine deceleration, the capacitor C5 does not charge on the sawtooth pulse, but discharges to the new lower value of V3. As a result, the output of the comparator A3 at V4 (see FIG. 7) will produce pulses anytime the engine is running at a constant speed or accelerating, but not when the engine is decelerating. Thus, during deceleration, the line L10 coupled to the output of comparator A3 provides a ground path for a junction J among three resistors R6, R9 and R14 of the voltage level detector 38, through a diode D2. This prevents the voltage level detector from producing an output upon normal engine deceleration. The diode D2 provides a blocking action to prevent the voltage at V4 from feeding into the voltage level detector circuit 38. Pulse width of the output V4 varies with engine acceleration, as explained further in connection with the time delay circuit 40.

VOLTAGE LEVEL DETECTOR

The voltage level detector 38 is programmed to produce an output when the voltage at V3 is at a predetermined level, unless the engine is decelerating normally (as distinguished from deceleration due to ignition interruption). This output serves to interrupt the ignition through the ignition interrupting circuit 44.

The voltage level detector 38 has a comparator A4 with a negative input connected to line L3 at the output of the power supply 30 through a line L11 and a resistor R8. Current flow to this input causes the output of the comparator A4 to remain low. A positive input of the comparator A4 is connected from line L7 through a line L12 and a line L13, and through resistors R6 and R9, to receive the signal V3. With the throttle sensor switch 14 open, as shown in FIG. 3, indicating the throttle should be in an idle position, the voltage V3 should stay too low to produce an output from the comparator A4. However, if engine speed increases due, e.g., to a stuck throttle, a point is reached where more current flows through the resistors R6 and R9 to the positive input of the comparator A4 than through the resistor R8 to the negative input, causing the output of the comparator A4 to go high. By the proper selection of the values of the resistors R8, R6 and R9, and adjustment of the variable resistor VR1, the output of the comparator A4 can be programmed to go high at a desired low engine speed, and at a desired high engine speed when the resistor R14 is utilized by closing the switch 14.

When the throttle sensor switch 14 is closed, as when the throttle control is actuated, the resistor R14 in the line L12, connected to ground through the sensor switch 14, acts as a divider with resistors R6 and R9 and reprograms the voltage level detector to operate only in response to a higher voltage V3 and hence at a higher engine speed. That is, with the inclusion of the resistor R14, the voltage V3 must be at a higher level to provide adequate current through the resistors R6 and R9 to cause the comparator A4 to produce a high output.

When the output of the comparator A4 goes high, the engine and ignition will be interrupted. The ignition interruption in turn causes the engine speed to decrease. The decrease in engine speed in turn causes the voltage V3 to decrease. A decrease in voltage V3 causes the comparator A4 to go low, which stops interruption of the ignition. The engine speed will then increase and the cycle begins over again. For example, if the resistors are selected to establish an engine speed when the throttle sensor switch 14 is open (i.e., the low limit) of 3000 rpm, then as long as the operator does not actuate the throttle to close the switch 14, the engine will not exceed 3000 rpm even if the throttle is stuck open. Rather, the engine speed will oscillate back and forth within a narrow range, for example, between approximately 2700 and 3000 rpm. While this is above the typical idle speed, it is below the typical speed necessary to engage an automatic clutch (torque converter) set for example to operate at 3600 rpm. As a result, there can be no driving of the vehicle through the stuck throttle, as long as the throttle lever is not actuated to close the switch 14.

When the throttle switch 14 is closed, a new higher speed limit is established which, for example, could be 9000 rpm. While operating the machine, if for any reason the engine tends to run at a higher speed (e.g., a broken drive belt), the engine speed will be limited to 9000 rpm (i.e., the high limit) in the same way. The particular speed limits are of course programmable and can be set for various types of machines.

During normal operation, when the engine is operating at some intermediate speed and the operator releases the throttle lever to decelerate, thereby opening the switch 14, the engine will decelerate. As indicated, this causes the voltage V3 and hence V4 to go low, shorting the juncture J of resistors R6, R9 and R14 to ground through the diode D2. This diverts the signal from the resistor R9 and the comparator A4 cannot go high. As a result, the ignition will not be interrupted during normal deceleration. Conversely, if the engine is running at constant or increasing speed above the present high or low levels (whichever is applicable in accordance with the condition of the switch 14), the voltage V4 will go high, intermittently causing the comparator A4 to go high and interrupt the ignition. The time during which the comparator A4 is high will follow the output of A3 and hence vary with engine acceleration, as will the waveform at V4. Thus, if the operator releases the throttle control and the engine does not decelerate, the output of the comparator A4 will provide pulses that are the same duration as those at V4 and will interrupt the ignition after a time delay intermittently in the above manner to keep the rpm below the predetermined level.

TIME DELAY

Because it is desirable to not interrupt ignition during normal deceleration, and deceleration results only after a slight delay upon release of the throttle and opening of the throttle sensor switch 14, it is necessary to delay the ignition cutoff in response to a high output from comparator A4 to avoid interfering with normal operation. In the preferred embodiment, a delay of about one second is established when the engine is running at a constant speed. However, for safety, if the engine is rapidly accelerating, such a delay would be too long to affect the desired speed limitation in case of a malfunction without risk of intervening injury or damage to the engine. In such a situation, then, the time delay must be almost nonexistent. The time delay 40 is a circuit in which a resistor R11 and a capacitor C6 form a basic resistance/capacitance time constant. The time delay 40 is interposed in a line L16 from the output of the comparator A4 to the ignition interrupter 44. The pulses from A4 cause the capacitor C6 to charge at a predetermined rate. If the engine is running at a constant speed, the pulses are relatively short, as indicated by the pulses shown in FIG. 7 on the left hand side. With such short pulses, the capacitor requires about one second to charge, in the preferred embodiment. If the engine is accelerating, the pulses are of longer duration, as shown in the right hand side of the voltage waveform of FIG.

7 and the capacitor C6 charges rapidly. More specifically, the capacitor C5 of the deceleration monitor 36 charges to the level of the voltage at V3, which varies with engine speed. As the engine speed accelerates, the voltage level changes and maintains the comparator A3 on for a longer time per pulse.

On the other hand, if the engine begins to decelerate before the capacitor C6 is charged, then the comparator A4 will turn off and capacitor C6 will discharge through the resistors R11 and R12. It will be apparent that no effective flow from A4 will actuate the ignition interrupter 44 through the resistor R12 until the capacitor C6 has sufficient charge.

FEEDBACK LATCH

When the ignition is interrupted while the engine is at a high speed (i.e., when the operator has released the throttle control, opening the throttle sensor switch 14, but the throttle is stuck and the engine does not decelerate) it is necessary to latch the deceleration monitor to a condition of high output until either the operator actuates the throttle control again or the engine speed has reached the low limit at which the clutch disengages. Otherwise, the speed will be limited, but will oscillate at a relatively high level and the machine will not come to a stop. This latch function is achieved by a feedback circuit consisting of a resistor R10 and a diode D3 in a line L14 extending between the line L9 at the positive input of the comparator A3 and the line L12, at the juncture of the capacitor C6 and resistor R11. When a voltage appears at the capacitor C6, current then flows through the resistor R10 and diode D3 to forward bias the positive input of the comparator A3. This in turn causes the output of comparator A3 to go high at V4, which allows the comparator A4 to remain high from the signal V3 through the resistances R6 and R9 until the signal V3 has dropped below the lower programmed speed limit or until the throttle sensor switch 14 is closed by the operator. Once the output of the comparator A4 returns low, the system is "unlatched," since a voltage no longer occurs at the resitor R10.

IGNITION INTERRUPTER

An ignition interrupter circuit 44 is provided in the line L12, which is coupled to the primary coil of the ignition 24. The interrupter circuit includes a solid state switch in the form of a silicon controlled rectifier SCR1 in the primary coil circuit. The output signal of the comparator A4 of the voltage level detector 38 operates the switch SCR1 through the time delay 40 to load the primary ignition coil through a line L14 and a power resistor PR1. Thus, assuming the throttle sensor switch 14 is opened and the engine does not decelerate, then after a short delay, enough voltage will appear at the capacitor C6 to turn on the silicon controlled rectifier SCR1 via the divider provided by resistors R12 and R13. Once the switch SCR1 turns on, it remains on until there is no voltage at the capacitor C6. The switch SCR1 does not latch on because the magneto or capacitor discharge ignition does not produce a constant current to maintain latching. A power resistor PR1 is used to reduce the power through the switch SCR1, allowing the use of a relatively small silicon controlled rectifier. While the switch SCR1 is turned on, the ignition primary system is loaded through the power resistor PR1 to the extent that the secondary winding will no longer produce sufficient voltage to fire the sparkplug or plugs of the engine.

Small engines used on recreational vehicles such as snowmobiles or the like have several types of capacitor discharge ignitions as well as magneto ignitions. All, however, can be interrupted by loading or by shorting a primary lead or charge lead to ground. This is conveniently done through a circuit as described, but might require different values of the power resistor PR1, depending upon the ignition type. Also, some capacitor discharge ignitions require isolation diodes for multicylinder operation to prevent the ignitions from feeding back into each other.

Suitable values for the circuit components referred to above for use with a commercial magneto or CD ignition type engine, such as the type used on snowmobiles, are indicated in the following table:

TABLE

| Component | Value |
| --- | --- |
| Resistor R1 | 100 ohms |
| Resistor R2 | 3.3 megohms |
| Resistor R3 | 1 megohm |
| Resistor R4 | 2.2K ohms |
| Resistor R5 | 1 megohm |
| Resistor R6 | 47K ohms |
| Resistor R7 | 4.7 megohms |
| Resistor R8 | 389K ohms |
| Resistor R9 | 47K ohms |
| Resistor R10 | 4.7K ohms |
| Resistor R11 | 4.7K ohms |
| Resistor R12 | 4.7K ohms |
| Resistor R13 | 1K ohms |
| Resistor R14 | 20K ohms |
| Zener Diode Z1 | 15 volts |
| Capacitor C1 | 22 microfarads at 16 volts |
| Capacitor C2 | .022 microfarads at 20 volts |
| Capacitor C3 | .022 microfarads at 20 volts |
| Capacitor C4 | 1 microfarad at 16 volts |
| Capacitor C5 | 10 microfarads at 16 volts |
| Capacitor C6 | 10 microfarads at 16 volts |
| Resistor PR1 | 200 ohms at 5 watts |
| Resistor VR1 | 220K ohms |

While a preferred embodiment of the invention has been described in detail, it will be apparent that modifications or alterations may be made therein without departing from the spirit and scope of the invention set forth in the appended claims. For example, it will be apparent that the signal output of the speed limiting circuit can be used to control various types of ignitions or alternatively other speed influencing systems, such as the fuel pump of a diesel engine, or the signal output could apply a speed limiting load to the engine, as by applying brake to the engine output. Also, an intermediate speed level can be programmed to control operation of the engine under specific circumstances. For example, by operating a switch in response to engine temperature certain malfunctions, such as loss of engine coolant or fan drive, or an improper fuel-air ratio, can be detected and used to limit the engine speed to a safe level by changing the input information to the voltage level detector; e.g., by reducing the effective resistance of the resistor R14 through the operated switch and modifying circuitry.

What is claimed is:

1. A method of controlling the operating speed of an internal combustion engine having an electrical ignition, an operator-actuated throttle control and means for sensing operator force upon the throttle control, and that drives a load through a centrifugal clutch, comprising the steps of: sensing during engine operation lack of deceleration of the engine speed upon removal of actuating force from the throttle control, and interrupting the ignition in the absence of sensed deceleration upon removal of actuating force from the throttle control until the engine speed is below that necessary to engage the centrifugal clutch.

2. A method as set forth in claim 1 including the subsequent step of maintaining engine speed within a range below that necessary to engage the centrifugal clutch and above engine idle speed.

3. A method of controlling the operating speed of an internal combustion engine having an electrical ignition system, comprising the steps of: (1) sensing the engine speed and (2) interrupting the ignition if the following conditions exist (a) the engine speed is above a predetermined speed, (b) an operator removes actuating force from a fuel throttle control of the engine, and (c) the engine speed has not decreased within a predetermined time after the actuating force has been removed.

4. A method of controlling the operating of a fuel powered engine, comprising the steps of: establishing a predetermined speed to which the engine is to operate under a predetermined condition, sensing the engine speed during its operation, producing a control signal when the engine speed is greater than the predetermined speed and only if the speed is not decreasing, and limiting the engine to a predetermined speed with said control signal without stopping the engine operation.

5. A method as set forth in claim 4 including the step of delaying limiting the engine speed for a time sufficient to allow normal engine deceleration to occur upon release of a throttle control by an operator.

6. A method as set forth in claim 5 including the step of reducing the length of the delay if the engine speed is accelerating when the speed is greater than the predetermined speed.

7. Apparatus for controlling the operating of a fuel powered engine comprising: means to indicate the engine speed during its operation, means to produce a control signal when the engine speed is indicated to be greater than a predetermined speed and only if the engine speed is not decreasing, and means to limit the engine speed to a predetermined speed in response to said control signal without stopping the engine operation.

8. Apparatus as set forth in claim 7 including means to delay limiting the engine speed following production of said control signal.

9. Apparatus as set forth in claim 8 wherein the means to delay includes means to vary the length of the delay with engine acceleration.

10. A circuit for controlling the operating speed of an internal combustion engine having an electrical ignition, an operator-actuated throttle control, and that drives a load through a centrifugal clutch, the circuit comprising: a switch for sensing operator force upon the throttle control, first means to sense during engine operation whether or not the engine decelerates upon removal of actuating force from the throttle control, and second means operative only if the engine has not decelerated to interrupt the ignition until the engine speed is below that necessary to engage the centrifugal clutch.

11. A circuit for controlling the operating speed of an internal combustion engine having an electrical ignition system, the circuit comprising: first means to sense the engine speed, and second means responsive to the first means to interrupt the ignition if (a) the engine speed is above a predetermined speed, (b) operator force on an actuator for a fuel throttle of the engine has been removed, and (c) the engine speed has not decreased within a predetermined time after removal of operator force from the actuator.

12. A method of controlling the operating speed of an internal combustion engine having an electrical ignition system, comprising the steps of sensing the engine speed, interrupting the ignition when the speed is greater than a predetermined speed and ending the ignition interruption when the engine speed reduces, sensing whether the engine speed is increasing at the time it is greater than the predetermined speed, delaying the interrupting of the ignition following sensing of said greater speed for a time duration that can be varied, and reducing the duration of the delay from a predetermined value if the engine speed is increasing when it is sensed as being greater than the predetermined speed.

13. A method of controlling the operating speed of an internal combustion engine having an electrical ignition system, comprising the steps of: producing an electrical signal indicative of engine speed, detecting when said signal is at or above a first predetermined value, interrupting said ignition in response to said detecting until the signal value reduces to below a second predetermined value, changing said first predetermined value by operating a switch associated with a throttle control for said engine, preventing interruption of the ignition when said signal is at or above said first predetermined value if the value of said detected signal decreases within a predetermined time after said detecting, producing second electrical signals in the form of pulses, proportional in frequency to engine speed and of a duration that varies in proportion to engine acceleration, and changing said predetermined time in response to a change in said duration.

14. A method as set forth in claim 13 wherein said predetermined value is changed between an upper and lower value and including the step of maintaining the ignition interrupted until either said switch is operated to raise said predetermined value or the signal reaches the lower predetermined value.

15. An electrical circuit for controlling the operating speed of an internal combustion engine having an electrical ignition system, said circuit comprising: first means to sense the engine speed, second means responsive to the first means to interrupt the ignition when the engine speed is greater than a predetermined speed and to end the ignition interruption when the engine speed reduces, whereby the engine remains running, and third means to delay operation of the second means for a time duration that is varied with engine speed increase.

16. A circuit as set forth in claim 10 wherein said second means is inoperative to interrupt the ignition at an engine speed as low as engine idle speed.

17. A circuit for controlling the operating speed of an internal combustion engine having an electrical ignition system, the circuit comprising: means to produce an electrical signal indicative of engine speed, means to detect when said signal reaches a predetermined value, means to interrupt said ignition in response to said signal reaching said value and until the signal value reduces to below said predetermined value, means including a switch associated with a throttle control for said engine to change said predetermined value, means to prevent interruption of the ignition when said signal is at or above a said predetermined value if said value decreases within a predetermined time, means to produce second electrical signals in the form of pulses proportional in frequency to engine speed and of a duration that varies in proportion to engine acceleration, and means to change said predetermined time in response to a change in said duration.

18. A circuit as set forth in claim 17 including means to maintain the ignition interrupted until either said switch is operated to raise said predetermined value or the signal reaches the predetermined value.

19. In a system for controlling the speed of an engine, a control circuit for connection among an alternator driven by the engine, an engine ignition circuit, and a switch sensitive to the position of a throttle actuator for the engine, said circuit comprising:
 a power supply with an input and an output, the input coupled to the alternator and the output forming a power source,
 pulse conditioning means including first means to compare two inputs, one from the power supply output and the other from the alternator, and to produce output pulses of a frequency proportional to engine speed,
 means to convert an input pulse frequency to a voltage the level of which is proportional to the frequency and including second means to compare two inputs, one from said pulse conditioning means and the other from its own output through a feedback circuit to produce a sawtooth voltage waveform,
 means to monitor the voltage from said second means, including third means to compare two inputs, one from said second means and the other from both said second means and a time delay circuit, to produce output pulses when said engine is running at a constant speed or accelerating, but not when decelerating,
 means for detecting the voltage level of the output from the frequency-to-voltage converting means, said means including fourth means to compare two inputs, one from the power supply and the other from the frequency-to-voltage converting means to produce an output when the voltage output of the frequency-to-voltage converting means reaches a predetermined level, and including means to change the level of the said other input through operation of said switch, thereby changing the output required from said frequency-to-voltage converter to produce an output from the voltage level detecting means,
 circuit means connecting the output of the monitor means to the said other input to the frequency-to-voltage converter to short the said other input to ground when no output is produced by said third means, to prevent any output from said fourth means from being produced,
 means for interrupting said ignition in response to an output from said fourth means,
 said time delay circuit including means to delay transmission of the output from said fourth means to the ignition interrupting means and means to produce an output that is coupled to said one input of said third means, and
 feedback means to couple said output from the time delay circuit to the said one input of said third means.

20. A method of controlling the operating speed of an internal combustion engine having an electrical ignition system, comprising the steps of: sensing engine speed, interrupting said ignition in response to sensing the speed at or above a predetermined value, changing the predetermined value by operating a switch associated with a throttle control for said engine, preventing interruption of the ignition when the speed is at or above a said predetermined value if said speed decreases within a predetermined time after said sensing, and reducing said predetermined time when the engine is accelerating.

21. A control circuit for controlling the speed of an engine, adapted for connection among an alternator driven by the engine, an engine ignition circuit, and a switch sensitive to the position of a throttle actuator for the engine, said circuit comprising:
 means to produce pulses of a frequency proportional to engine speed,
 means to convert the pulse frequency to a voltage the level of which is proportional to the frequency,
 means to monitor the voltage to produce output pulses when said engine is running at a constant speed or accelerating, but not when decelerating,
 means for detecting the voltage level of the output from the frequency-to-voltage converting means and to produce an output when the voltage reaches a predetermined level,
 means to change said level through operation of said switch,
 circuit means connecting the output of the monitor means to the frequency-to-voltage converting means to prevent any output from said converting means when there is no output from the monitor means,
 means for interrupting said ignition in response to an output from said frequency-to-voltage converting means,
 a time delay circuit including means to delay transmission of the output from said frequency-to-voltage converting means to the ignition interrupting means and means to produce an output that is coupled to said monitor means, and
 feedback means to couple said output from the time delay circuit to the said monitor means.

22. A circuit for controlling the operating speed of an internal combustion engine having a throttle, an electrical ignition and an operator-actuated control for the engine throttle, and that drives a load through a centrifugal clutch that engages at a predetermined engine speed, said circuit comprising: a normally open switch that is closed in response to operator force applied to the throttle control, and means to limit engine speed to below that necessary to engage the centrifugal clutch in response to said switch being open and regardless of the condition of the throttle.

* * * * *